United States Patent [19]

Rhodes et al.

[11] Patent Number: 5,352,754

[45] Date of Patent: * Oct. 4, 1994

[54] HIGH IMPACT POLYURETHANE

[75] Inventors: Delmer R. Rhodes; James M. Lambert, both of Sandy, Utah; Donald D. Solomon, Biviers, France

[73] Assignee: Becton, Dickinson and Company, Franklin Lakes, N.J.

[*] Notice: The portion of the term of this patent subsequent to Nov. 30, 2010 has been disclaimed.

[21] Appl. No.: 966,234

[22] Filed: Oct. 26, 1992

[51] Int. Cl.$^5$ ............. C08G 18/18; C08G 18/32; C08G 18/73

[52] U.S. Cl. .................. 528/28; 528/76; 528/80; 528/83; 528/85; 525/453

[58] Field of Search ............ 528/28, 76, 80, 83, 528/85; 521/112, 129, 164, 170, 172, 173, 174, 176; 525/453

[56] References Cited

U.S. PATENT DOCUMENTS

| | | | |
|---|---|---|---|
| Re. 31,389 | 9/1983 | Brauer et al. | 528/60 |
| 2,284,637 | 6/1942 | Catlin | 521/170 |
| 3,307,948 | 3/1967 | Thiers et al. | 528/85 |
| 3,669,991 | 6/1972 | Eimers | 528/85 |
| 4,068,035 | 1/1978 | Violland et al. | 528/85 |
| 4,442,281 | 4/1984 | Hentschel et al. | 528/79 |
| 4,447,590 | 5/1984 | Szycher | 528/76 |
| 4,448,903 | 5/1984 | Liang et al. | 528/75 |
| 4,523,005 | 6/1985 | Szycher | 528/76 |
| 4,757,096 | 7/1988 | Berthevas et al. | 521/164 |
| 4,808,636 | 2/1989 | Saito et al. | 521/164 |
| 4,822,827 | 4/1989 | Bonk et al. | 528/85 |
| 4,917,850 | 4/1990 | Gray | 264/301 |
| 4,919,878 | 4/1990 | Pilger et al. | 521/164 |
| 4,980,385 | 12/1990 | Scarpati et al. | 528/49 |
| 5,254,662 | 10/1993 | Szycher et al. | 528/85 |
| 5,266,669 | 11/1993 | Onwunaka et al. | 528/28 |

Primary Examiner—John Kight, III
Assistant Examiner—Rabon Sergent
Attorney, Agent, or Firm—Richard E. Brown

[57] ABSTRACT

A non-yellowing, impact resistant high hard segment polyurethane made from a non-aromatic diisocyanate, a diol chain extender and an aminodiol chain extender may also contain up to five percent by weight of a macroglycol. A catalyst free method to prepare the polyurethane is a feature of the invention.

10 Claims, No Drawings

HIGH IMPACT POLYURETHANE

BACKGROUND OF THE INVENTION

1. Field of the Invention

This invention relates to thermoplastics and more particularly relates to high hard segment polyurethanes and medical articles therefrom.

2. Background of the Invention

Polyurethanes possess an outstanding balance of physical and mechanical properties and superior blood compatibility compared to other polymers such as silicone rubber, polyethylene, polyvinyl chloride and perfluorinated polymers. As a result, they have come to the fore as the preferred polymeric biomaterials for fabrication of various medical device components. Some important device applications for polyurethanes include peripheral and central venous catheters, coatings for heart pacemaker leads and the Jarvik heart.

As known in the art, polyurethanes are synthesized from three basic components, a diisocyanate, a polyglycol and an extender, usually a low molecular weight diol, diamine or water. If the extender is a diol, the polyurethane consists entirely of urethane linkages. If the extender is water or diamine, both urethane and urea linkages are present and the polyurethane is termed a polyurethaneurea.

The diisocyanate may be aromatic, aliphatic or cycloaliphatic. Commonly used aromatic diisocyanates are toluene diisocyanate and 4,4'-diphenylmethane diisocyanate (MDI). The polyglycol is usually a polyether or polyester having terminal hydroxyl groups for reaction with the diisocyanate.

Polyurethanes develop microdomains conventionally termed hard segments and soft segments, and as a result are often referred to as segmented polyurethanes. The hard segments form by localization of the portions of the polymer molecules which include the isocyanate and extender components and are generally of high crystallinity. The soft segments form from the polyglycol portions of the polymer chains and generally are either noncrystalline or of low crystallinity. One of the factors which determines the properties of the copolymer is the ratio of hard and soft segments. In general, the hard segment contributes to hardness, tensile strength, impact resistance, stiffness and modulus while the soft segment contributes to water absorption, elongation and elasticity.

Polyurethanes chain extended with diols have been extensively studied for biomedical application. Exemplary of important diol extended polyurethanes are: VIALON TM (Becton, Dickinson and Co.) PELLETHANE TM (Upjohn Chemical Co.,) and TECOFLEX TM (Thermedics Inc.). These proprietary products typically have good blood compatibility, but, with the exception of VIALON TM, generally require processing additives such as antioxidants and detackifiers, a potential disadvantage for use in biomedical articles. They are, however, thermoplastic and therefore may be melt extruded and injection molded.

The TECOFLEX TM polyurethanes are synthesized from nonaromatic diisocyanates and polyglycols and are disclosed in U.S. Pat. No. 4,523,005 to Syzcher. Other U.S. patents disclosing polyurethanes synthesized from polyglycols and nonaromatic isocyanates are U.S. Pat. No. 4,442,281 to Hentschel et. al. and U.S. Pat. No. 4,917,850 to Gray.

Polyurethanes based on aromatic isocyanates have many salubrious properties which have made them useful for fabrication of medical devices. An MDI-based polyurethane of almost 100% hard segment is claimed to be a tough engineering grade high impact resin. This product is named ISOPLAST TM (Dow Chemical Co., Midland, Mich.) and is described by Ehrlich et. al. in *Journal of Elastomers and Plastics*, 136 (1984) and by Bonk et al. in U.S. Pat. No. 4,822,827.

The present invention is directed to engineering grade thermoplastic polyurethanes synthesized without heavy metal leachable and potentially toxic catalysts and thus are eminently suitable for fabrication of medical devices.

SUMMARY OF THE INVENTION

A melt processable non-elastomeric polyurethane is the product from the reaction of a non-aromatic diisocyanate, a diol chain extender and a bis hydroxyalkyl tertiary amine chain extender. Preferred diisocyanates are alicyclic diisocyanates, most preferably 4,4'-dicyclohexylmethane diisocyanate (HMDI). Preferred diols have up to 10 carbon atoms. The most preferred diol is 1,4-butanediol (BDO). Preferred tertiary amines are dialkanolamines, most preferably N-butyl diethanolamine (BDA).

The invention provides polyurethanes of at least 95% hard segment which are thermoplastic, clear, tough and resistant to impact. They are synthesized by a process free of any heavy metal or amine catalyst which may remain as a leachable residue in the final product. The presence of outstanding physical-mechanical properties and radiation stability and absence of potentially toxic, leachable material makes them particularly well suited for molding and extruding medical device components intended for contact with a patients body fluid, such as catheter adapters, needle hubs, lancets, implants and the like.

DETAILED DESCRIPTION

While this invention is satisfied by embodiments in many different forms, there will herein be described in detail preferred embodiments of the invention, with the understanding that the present disclosure is to be considered as exemplary of the principles of the invention and is not intended to limit the invention to the embodiments described. The scope of the invention will be measured by the appended claims and their equivalents.

In accordance with the present invention, it has been found that high durometer, high hard segment, non-elastomeric polyurethanes made by a process free from leachable and potentially toxic catalysts are suitable as radiation stable medical device components such as catheter adapters, needle hubs, lancets and the like. In addition they are useful for blown articles, such as foams, intended for applications where strength and rigidity are advantageous. The polyurethanes of the invention may be made from non-aromatic polyisocyanates, alkylene diol and amino diol chain extenders. Such products are 100% hard segment polyurethanes. For some applications, it may be desirable to include in the polyurethane up to 5% by weight of a soft segment component, such as a macroglycol. Polyisocyanates useful in the present invention are aliphatic or alicyclic isocyanates. Representative of suitable isocyanates are aliphatic diisocyanates such as 1,6-hexamethylene diisocyanates (1,6DI), trimethylhexamethylene diisocyanate (TMDI) and 1,10-decamethylene diisocyanate. Preferred isocyanates are alicyclic diisocyanates such as isophorone diisocyanate. The most preferred isocyanate is HMDI.

The first chain extender component may be any branched or unbranched diol of up to 12 carbon atoms. Representative nonlimiting examples of chain extenders are ethylene glycol (EG), diethylene glycol, triethylene glycol, 1,2-propanediol, 1,3-propanediol, 1,6-hexanediol, 1,8-octanediol (ODO), bis hydroxymethyl cyclohexane, and hydroquinone dihydroxyethyl ether. The preferred extender is BDO.

The second chain extender component may be a bis hydroxyalkyl tertiary amine having the following structure:

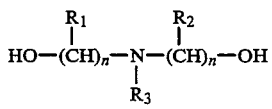

In this structure, $R_1$ and $R_2$ may independently be hydrogen or lower alkyl, $R_3$ may be lower alkyl and n may be 2 to 6 wherein the term alkyl means about 1 to carbon atoms. Suitable tertiary amines are, for example, N-methyldiethanolamine, N-dodecyldiethanolamine, N-octadecyldiethanolamine and N-ethyldiisopropanolamine. The preferred bis hydroxyalkyl tertiary amine is BDA. This product is available from Union Carbide Corporation, (Bound Brook, N.J.), and the invention will henceforth be described in terms of the preferred BDA.

The ratio of the diol and amino diol components of the extender may be about 1:99 to 99:1, respectively. A preferred ratio is about 10.1, most preferably about 5:1.

Macroglycols useful in the present invention are polyester glycols, silicone glycols and polyether glycols. These glycols are well known in the art and many are commercially available. Preferred macroglycols are polyethers having a molecular weight of about 500 to 8000, such as polyethyleneoxide glycol. The most preferred polyether is polytetramethylene ether glycol (PTMEG) having a molecular weight of about 500 to 3000, preferably about 1000 to 2000. These products are available commercially under the trade names POLY-MEG TM (Quaker Oats Co., Chemical Division) and TERETHANE TM (Dupont) respectively.

Although aromatic diisocyanates readily enter into polyurethane-forming reactions in the absence of catalysts, the less reactive aliphatic and alicyclic diisocyanates do not form polyurethanes with diols unless catalyst is present.

As is known in the polyurethane art, heavy metal organometallic compounds, such as dibutyl tin dilaurate and stannous octoate, and tertiary amines may be used to catalyze reactions leading to polyurethanes. Catalysts of either type remain as a leachable residue in the final product. Since it is known that both types, particularly organometallic materials, may be toxic, and residual tertiary amine leaves an objectionable odor, particularly in blown objects, synthesis of polyurethanes by a catalyst-free process would be advantageous especially for medical device elements contemplated for contact with a patient's body fluid.

These problems in prior art polyurethane disclosures are overcome in the present invention by using the aminodiol component to promote the isocyanate reaction. This component is inherently non-toxic, and, because it becomes part of the polymer chain, is not a true catalyst. Since it reacts with the isocyanate, it is a coextender, along with the diol. Being part of the polymer chain, it is non-leachable. Thus, the polyurethanes of the invention may be prepared by a modification of the process generally referred to as bulk or one-shot synthesis. In the conventional one-shot process for non-aromatic polyurethanes, all of the ingredients are combined at the beginning of the process and subjected, usually with stirring, to a polymerization catalyst. It has now been discovered, in contrast to the prior art, that non-aromatic polyurethanes which are melt processable may be obtained by a simple one-pot procedure without a conventional organometallic or tertiary amine catalyst.

In this disclosure, the hard segment includes the isocyanate, diol and aminodiol extender components and the soft segment, if any, includes the macroglycol. An isocyanate index of 1.0 to 1.1, preferably about 1.02, may be used. From the desired hard segment content of the product, the isocyanate index, the ratio of diol to amino diol and the molecular weights of the components, the proportions of the reagents to be used may readily be calculated.

In one preferred process of the invention, conventional polymerization equipment is charged with a mixture of the macroglycol, if any, and extenders in proportions predetermined in accordance with the desired hard segment-soft segment ratio. With vigorous stirring, the diisocyanate may be added all at once. If the reaction does not start spontaneously, the mixture may be heated sufficiently to induce an exothermic reaction. The reaction mixture may be stirred vigorously until the exotherm is complete and the temperature begins to drop off, generally for about 1 to 5 minutes. The clear homogeneous melt, while still hot, may advantageously be removed from the reactor prior to curing.

Any conventional method may be used to effect curing depending upon the application intended. The melt may be set aside for a suitable time and temperature, as, for example, from ambient to about 130° C. and for about 1 hour to 20 days, to be cured by atmospheric moisture. If the polyurethane is to be used as a foam, water may be used to cure the product wherein carbon dioxide is the foaming agent.

Any polymerization equipment or technique which provides a clear melt at the conclusion of the exotherm is contemplated to fall within the scope of the invention. Preferred equipment includes a multi-paddle shaft driven at high rotation rate by a motor. Exemplary of such a system is the Fluidyne Model 630H MICRO-SHOT TM Elastomer processing System.

The polyurethane resins of the invention may be fabricated into film, tubing and other forms by conventional thermoplastic fabricating techniques including melt casting, extrusion, molding, etc., or may be blown into foams in accordance with conventional foam techniques. The resin may have incorporated therein, as desired, conventional stabilizers, radiopaque materials such as barium sulfate, and the like. The amounts of these materials will vary depending upon the application of the polyurethane, but they are typically present in amounts ranging from about 0.1 to 40 weight percent of the polymer.

Tensile strength is a measure of the force, generally given in pounds per square inch (psi) required to break a polymer. Elongation is a measure of the ability of a polymer to stretch without breaking, and is generally reported as a percentage of an initial value. The term modulus defines the force, in psi, required to stretch a polymer to a given percentage of elongation.

The tensile, elongation and modulus of the polyurethane of the invention may be measured by ASTM procedure D638 using an Instron Universal Testing Instrument, Model 1122. Representative polymers of the invention are given, along with their physical properties, and hard segment (HS) content in Table I.

TABLE I

| | isocyanate | extender | Physical Properties modulus (psi) 25% | 100% | tensile (psi) | elongation % | hard segment % |
|---|---|---|---|---|---|---|---|
| 1 | HMDI | EG | | | 11300 | 16 | 100 |
| 2 | HMDI | EG | | | 7700 | 6 | 95 |
| 3 | HMDI | BDO | | | 8900 | 15 | 100 |
| 4 | HMDI | BDO | 7430 | 5780 | 7450 | 34 | 95 |
| 5 | HMDI | ODO | 5590 | 5640 | 6600 | 210 | 100 |
| 6 | 1,6DI | BDO | 3960 | 4100 | 8800 | 235 | 100 |
| 7 | 1,6DI | BDO | 3250 | 3340 | 7350 | 278 | 95 |
| 8 | ISOPLAST TM | | | | 8500 | 150 | 95 |

In addition to the mechanical properties shown in Table I, the polyurethanes of the invention made with BDA catalyst have higher molecular weights than polyurethanes synthesized under identical conditions in accordance with Example I but catalyzed by a conventional organotin catalyst. This data is presented in Table II.

TABLE II

| Polyurethane 100% HS | Molecular Weight* Number Average | Weight Average | Dispersity |
|---|---|---|---|
| HMDI, EG, BDA | 19,400 | 77,200 | 3.78 |
| HMDI, EG, tin | 13,300 | 34,200 | 2.57 |
| TMDI, BDO, BDA | 14,200 | 44,800 | 3.15 |
| TMDI, BDO, tin | 11,800 | 34,400 | |

*determined by conventional gel permeation chromatography

The following Examples are provided to further describe the invention but are not to be considered in any way to be limitative of the invention.

EXAMPLE I

Polyurethane of 100% Hard Segment

HMDI, 401.3 g (3.04 eg.), EG, 88.7 g (2.86 eq) and BDA, 10.00 g (0.24 eq), isocyanate index 1.02, were mixed thoroughly and heated with vigorous stirring to 50° C. to induce an exotherm. After a reaction time of about 4 minutes, the exotherm began to cool, and the viscous melt was poured into a tray and set aside at ambient temperature for 16 hours to effect moisture curing. A hard, tough polymer was obtained. Infrared spectroscopy of this product showed a strong urethane peak at 1705 cm$^{-1}$ and no isocyanate peak at 2265 cm$^{-1}$.

EXAMPLE II

Polyurethane of 95% Hard Segment

In the same way as described in Example I, a polyurethane was synthesized from HMDI, 355.0 g (2.69 eq); PTMEG of 1000 mol. wt., 25.0 g (0.05 eq), BDO, 112.1 g (2.49 eq) and BDA, 8.00 g (0.10 eq), isocyanate index 1.02.

EXAMPLE III

In the same way as described in Example I, a 100% hard segment polyurethane was synthesized from TMDI, BDO and BDA.

COMPARATIVE EXAMPLE IV

In a manner similar to that described in Example I, HMDI, 374.62g (2.838eq) and BDO (125.38g, 2.783eq) were stirred vigorously at 30° C. for 15 min. In the absence of catalyst in this experiment, no reaction took place. No exotherm occurred and a thick liquid resulted.

When heated to 100° C. for 1 hour, a hard brittle mass was formed which showed a strong peak in the infrared at 2265 cm$^{-1}$ for unreacted isocyanate and substantially no peak at 1705 cm$^{-}$ for urethane.

EXAMPLE V

The polyurethanes of 95 and 100% hard segment of Examples I and II were tested for yellowing by the procedure of ASTM D 1925. Circular discs (2.54 cm diameter; 0.127 cm thick) and rectangular strips (6 cm by 1.27 cm; 1.65 cm thick) were subjected to radiation levels of 2.5 and 5.0 megarads). The product after irradiation were substantially unchanged in color or suffered only slight to moderate yellowing. ISOPLAST TM in contrast turned brown.

What is claimed is:

1. A melt processable, non-elastomeric polyurethane consisting essentially of a product from the reaction of a non-aromatic diisocyanate, a diol chain extender of up to 12 carbon atoms and a bis-hydroxyalkyl tertiary amine catalyst, said polyurethane being devoid of leachable heavy metal or leachable tertiary amine materials.

2. The polyurethane of claim 1 wherein said non-aromatic diisocyanate is selected from the group consisting of isophorone diisocyanate, 4,4'-dicyclohexylmethane diisocyanate and 1,6-hexamethylene diisocyanate.

3. The polyurethane of claim 1 wherein said diol chain extender is selected from the group consisting of ethylene glycol, diethylene glycol, triethylene glycol, 1,2-propanediol, 1,3-propanediol, 1,6-hexanediol, 1,8-octanediol, 1,4-bis hydroxymethyl cyclohexane, 1,4-butanediol, and hydroquinone dihydroxyethyl ether.

4. The polyurethane of claim 1 wherein said bis hydroxyalkyl tertiary amine is selected from the group consisting of N-methyldiethanolamine, N-dodecyldiethanolamine, N-octadecyldiethanolamine, N-ethyldiisopropanolamine and N-butyldiethanolamine.

5. A melt processable non-elastomeric polyurethane consisting essentially of the reaction product of 4,4'-dicyclohexylmethane diisocyanate, 1,4-butanediol and N-butyldiethanolamine catalyst, said polyurethane being devoid of leachable heavy metal or leachable tertiary amine materials.

6. A method to prepare a melt processable, non-elastomeric polyurethane comprising:
   a) preparing a mixture consisting essentially of a non-aromatic diisocyanate, a diol chain extender and a bis-hydroxylalkyl tertiary amine, said tertiary amine being both a chain extender and a catalyst;
   b) stirring said mixture at a temperature sufficient to induce reaction between said isocyanate and said chain extenders to give a viscous melt; and
   c) curing said melt, whereby said polyurethane is devoid of leachable heavy metal or leachable tertiary amine materials.

7. The method of claim 6 wherein said melt is cured with water.

8. A melt processable, non-elastomeric polyurethane consisting essentially of a product from the reaction of a non-aromatic diisocyanate, a diol chain extender of up to 12 carbon atoms, a bis-hydroxylalkyl tertiary amine catalyst and up to 5 weight percent of a macroglycol having a molecular weight of about 500–8000 selected from the group consisting of a polyether glycol, a polyester glycol and a silicone glycol, said polyurethane being devoid of leachable heavy metal or leachable tertiary amine materials.

9. A melt processable non-elastomeric polyurethane consisting essentially of the reaction product of 4,4'-dicyclohexylmethane diisocyanate, 1,4-butanediol, N-butyldiethanolamine catalyst and up to 5 percent by weight of a macroglycol selected from the group consisting of polyethylene oxide glycol and polytetramethylene ether glycol, said polyurethane being devoid of leachable heavy metal or leachable tertiary amine materials.

10. A method to prepare a melt processable, non-elastomeric polyurethane comprising:
   a) preparing a mixture consisting essentially of a non-aromatic diisocyanate, a diol chain extender, a bis-hydroxylalkyl tertiary amine which is both a chain extender and a catalyst and up to 5 weight percent of a macroglycol having a molecular weight of about 500–8000;
   b) stirring said mixture at a temperature sufficient to induce reaction between said isocyanate, chain extenders and macroglycol to give a viscous melt; and c) curing said melt, whereby said polyurethane is devoid of leachable heavy metal or leachable tertiary amine materials.

* * * * *